Jan. 15, 1929.
L. R. PROVOST ET AL
1,699,249
ADJUSTABLE SEAT
Filed April 4, 1927  2 Sheets-Sheet 1
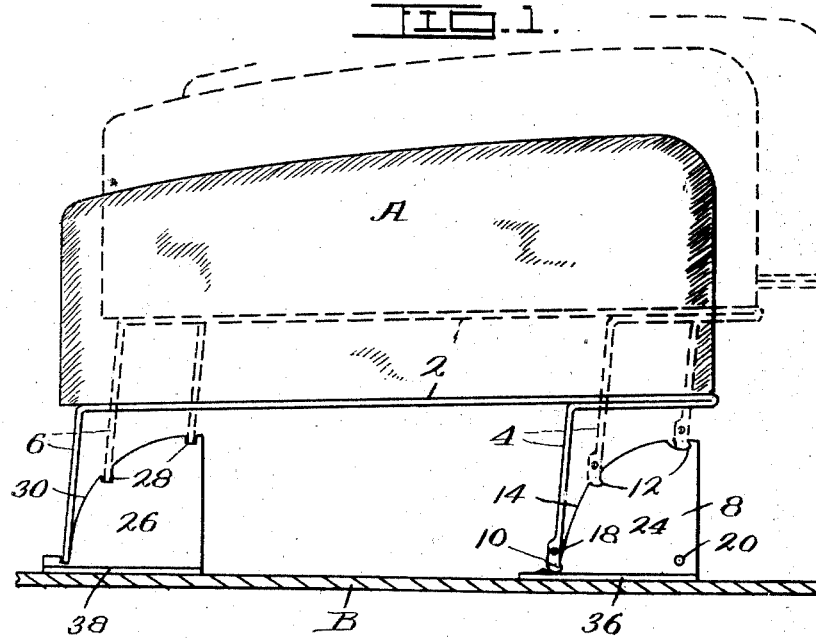
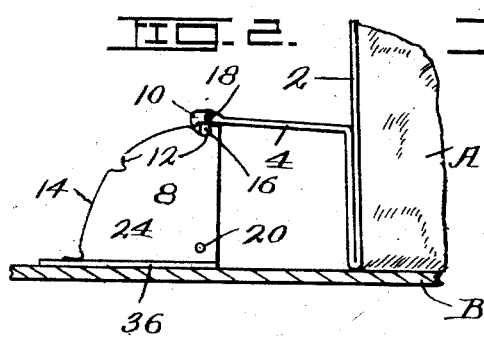
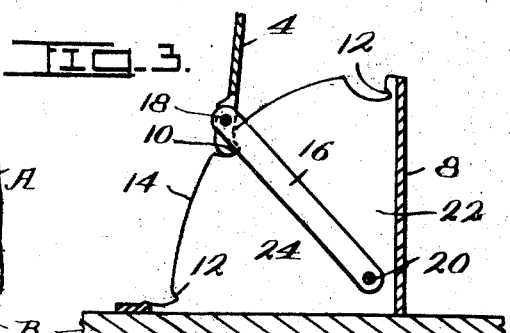
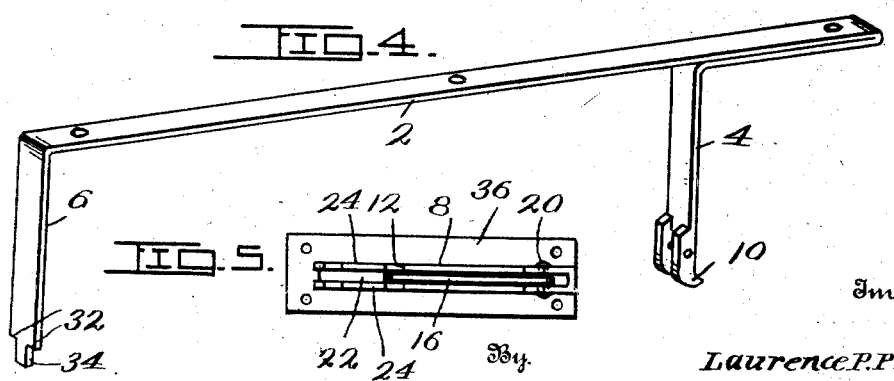
Inventors.
Laurence P. Provost
and Harold Brown,
F. G. Fischer,
Attorney
Witness:
Fred G. Fischer,

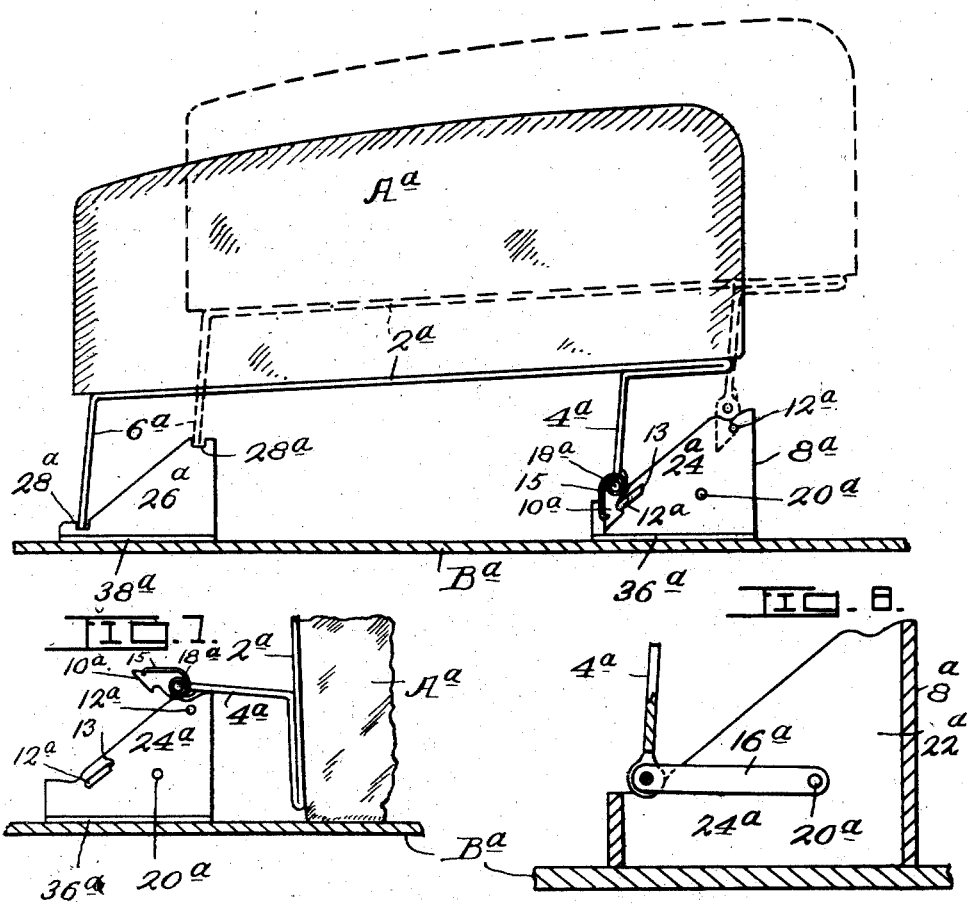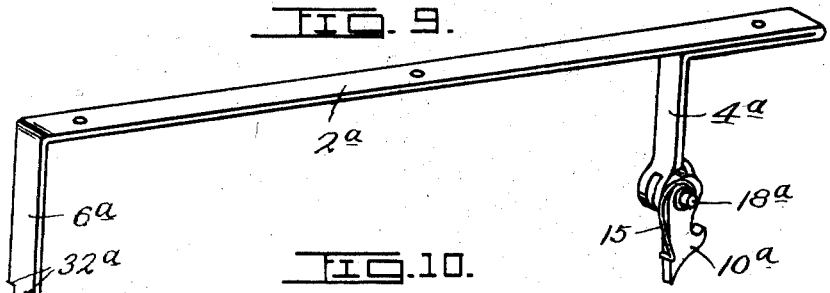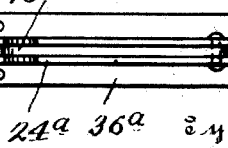

Patented Jan. 15, 1929.

1,699,249

UNITED STATES PATENT OFFICE.

LAURENCE R. PROVOST, OF SHAWNEE, AND HAROLD BROWN, OF KANSAS CITY, KANSAS.

ADJUSTABLE SEAT.

Application filed April 4, 1927. Serial No. 180,924.

Our invention relates to improvements in adjustable seats and one object is to provide a seat which can be readily adjusted to forward, backward, and intermediate positions.

A further object is to provide a seat in which vertical adjustment is had simultaneously with the forward, backward, and intermediate adjustments.

Another object is to provide a seat which can be arranged close to the floor of a motor car, airplane, boat, or other vehicle and tipped upwardly out of the way to provide a passage for persons entering and leaving such vehicle.

A further object is to provide a seat which is automatically locked against accidental movement when adjusted to a sitting position.

In order that the invention may be fully understood, reference will now be had to the accompanying drawings, in which:

Fig. 1 is a side elevation of the preferred form of invention, three different seating positions being shown by full and dotted lines.

Fig. 2 is a fragmentary side elevation showing the seat tipped forwardly and upwardly to provide a passageway.

Fig. 3 is a slightly enlarged vertical section of one of the forward brackets and associate parts.

Fig. 4 is a detail perspective view of one of a pair of seat-supporting members.

Fig. 5 is a plan view of the bracket and swingable element disclosed by Fig. 3.

Fig. 6 is a side elevation of a modified form of seat supporting mechanism.

Fig. 7 shows the seat tilted forwardly and upwardly to provide a passageway.

Fig. 8 is a slightly enlarged vertical section of one of the front brackets and associate mechanism.

Fig. 9 is a detail perspective view of one of a pair of seat-supporting members.

Fig. 10 is a detail plan view of the bracket and swingable element disclosed by Fig. 8.

Referring more particularly to the forms disclosed by Figs. 1 to 5, inclusive, A designates a suitable seat which is secured to a pair of supporting members 2 having rigid downwardly extending front and rear arms 4 and 6, respectively. The front arms 4 are spaced backwardly from the front ends of the supporting members 2 in order to clear the top of a pair of front brackets 8 when the seat A is tilted forwardly and upwardly to the position disclosed by Fig. 2 to provide a passageway to and from a rear seat, not shown, when the invention is installed in a vehicle having front and rear seats.

The lower portions of the front arms 4 are provided with latch members 10 adapted to coengage complemental latch members 12 formed in the curved surfaces 14 of the front brackets 8 for securing the supporting arms 4 and the seat A in different positions as shown by full and dotted lines, Fig. 1. The lower portions of the front arms 4 are operably connected to the front brackets 8 by suitable means such as swingable elements 16 which, in the present instance, are connected to the arms 4 by pivots 18 and to the brackets 8 by pivots 20. The swingable elements 16 guide the arms 4 as the latter are moved to their different positions, and also coact in holding the latch elements 10 and 12 from accidental disengagement after the seat A and the arms 4 have been adjusted to the different positions shown by Fig. 1. As shown more clearly by Fig. 5, the swingable elements 16 operate in slots 22, the opposite walls 24 of which support said swingable elements 16 from sidesway.

The rear arms 6 are supported by a pair of rear brackets 26 which may correspond with the brackets 8, excepting that instead of having latch elements 12, notches 28 are formed in the curved surfaces 30 to receive the oppositely-disposed shoulders 32 formed on the lower portion of each arm 6. A lug 34 extends downwardly from between each pair of shoulders 32 to enter the respective brackets 26 and coact with said shoulders 32 in preventing sidesway of the arms 6. The brackets 8 and 26 have base portions 36 and 38, respectively, so that they may be firmly bolted or otherwise secured to the floor B of the vehicle in which the seat A is installed.

In practice when the seat A is to be moved upwardly and forwardly from the full line position to either of the dotted line positions, Fig. 1, the rear end of said seat is grasped and rocked upwardly upon the pivots 18 in order to rock the latch elements 10 out of engagement with the lower latch elements 12. The seat A is then moved bodily upwardly and forwardly until the latch elements 10 are opposite either the intermediate or the upper latch elements 12 as preferred, whereupon the rear end of said seat is lowered to rock the latch elements 10 into engagement with such latch elements 12. As the latter operation is performed the shoulders 32 on the rear arms 6 become seated in the intermediate or upper notches 28 according to whether the latch members 10 are engaged with the intermediate or the upper latch members 12. The seat A is now firmly secured and without danger of accidentally shifting its position under the weight of the occupant. The seat A after being adjusted to the forward, backward, or intermediate position presents a comfortable seat to the occupant as it is not tipped more in one position than another. In addition to the various positions above mentioned, the seat A may be tilted to the position disclosed by Fig. 2, which in connection with the adjustments aforementioned, make it very desirable for use in motor vehicles of the coach type where one or both front seats must be tilted upwardly and forwardly for the purpose of leaving a passageway to and from the rear seat.

In the modified form disclosed by Figs. 6 to 10, inclusive, the construction and operation of the different parts is substantially the same as that of the parts disclosed by Figs. 1 to 5, inclusive, as is evidenced by corresponding reference numerals with exponents "a", the chief differences being that the brackets $8^a$ and $26^a$ have no intermediate latch members $12^a$ but have only upper and lower latch members $12^a$, and hence the seat $A^a$ can be adjusted only to an extreme backward position as shown by full lines, or to an extreme forward and upward position as shown by dotted lines, Fig. 6, in addition to the tilted position shown by Fig. 7.

Another departure from the preferred form resides in the latch members $10^a$ which are connected to the lower ends of the front arms $4^a$ by the pivots $18^a$ instead of being rigidly connected to said arms $4^a$. By pivotally connecting the latches $10^a$ and forming extensions 13 on the lower latch members $12^a$, the latter will guide the former into the locking engagement shown by full lines, Fig. 6, in the event the operator should let the seat $A^a$ down too soon and cause the lower end of the latches $10^a$ to contact said extensions 13. The latches $10^a$ are free to swing backwardly to facilitate their engagement with the lower latch members $12^a$, but are normally held by springs 15 in the position shown by Figs. 6 and 9.

While we have shown two forms of the invention, we reserve the right to all such other forms and modifications as properly fall within the spirit and scope of the invention as claimed.

Having thus described our invention, what we claim and desire to secure by Letters Patent, is:

1. In combination, movable seat supporting members having downwardly extending front and rear arms, front and rear brackets for supporting said arms in different positions and provided with curved surfaces, coacting latch means on the front brackets and the front arms for securing the latter at different points upon the associate curved surfaces, and swingable elements pivotally connected to the front arms and brackets and extending radially of the center of the last-mentioned curved surfaces.

2. In combination with a seat adapted to be moved bodily to forward, backward, and intermediate seating positions, supporting members secured to and movable with said seat and provided with rigid downwardly extending front and rear arms, latch members on the lower ends of the front arms, front and rear brackets for supporting the arms in their forward, backward, and intermediate positions, latch members on the front brackets which are automatically engaged by the latch members on the front arms as the latter are adjusted to their different positions, and swingable elements operably connecting the front brackets and the front arms for holding the latter in spaced relation with said front brackets and also upon which the front arms may swing and thereby allow the seat to be adjusted to a vertical position.

3. In combination with a seat adapted to be moved bodily to different positions, supporting members secured to and movable with said seat and provided with downwardly extending front and rear arms, slotted brackets for supporting the front arms in their different positions, elements swingably mounted in the slotted portions of said brackets and operably connected to the latter and the front arms, and brackets for supporting the rear arms in their different positions.

4. In combination with a seat adapted to be moved bodily to different positions, supporting members secured to and movable with said seat and provided with downwardly extending front and rear arms, front brackets for supporting the front arms in different positions, vertically slotted rear brackets having notches on opposite sides of their slotted portion, shoulders on the lower portions of the rear arms adapted to seat in said notches and lugs depending from said shoulders and adapted to enter said slotted portions.

In testimony whereof we affix our signatures.

LAURENCE R. PROVOST.
HAROLD BROWN.